Patented May 9, 1944

2,348,425

UNITED STATES PATENT OFFICE 2,348,425

ANTIVITAMIN

Esmond E. Snell, Austin, Tex., assignor to Research Corporation, New York, N. Y., a corporation of New York No Drawing. Application April 23, 1943,
Serial No. 484,291

13 Claims. (Cl. 260—513)

This invention relates to the provision of compounds which are antagonistic to the growth promoting or supporting properties of pantothenic acid.

I have found that whereas pantothenic acid is necessary to the growth of certain organisms, such as *Lactobacillus arabinosus*, certain compounds which differ from pantothenic acid in a way similar to that in which sulfanilamide and its bacteriostatic derivatives differ from p-aminobenzoic acid are capable of neutralizing or inhibiting or reversing this growth promoting effect of the pantothenic acid. Such compounds may, therefore, be expected to be useful as bacteriostatic agents in the treatment of diseases, the growth and/or multiplication of the organisms of which depends upon the presence of pantothenic acid. Compounds in accordance with the invention are embraced by the general formula

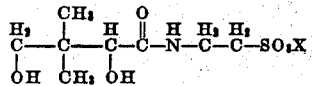

in which X stands for a member of the group consisting of hydrogen and the alkali and alkaline earth metals. As will be apparent, such compounds differ from pantothenic acid in that the —COOH group of the latter is replaced in the former by the sulfo group, —SO₃X.

The compounds are prepared, in accordance with my invention, by the interaction of α-hydroxy-β,β-dimethyl-γ-butyrolactone with taurine (β-aminoethyl sulfonic acid) and its alkali and alkaline earth metal salts.

Example 1

5 grams of levo-α-hydroxy-β,β-dimethyl-γ-butyrolactone was melted at 100° C. To the melt was added 5.7 grams of dry powdered sodium salt of taurine. The mixture was maintained at 120–130° C. for 3 hours with occasional stirring. The melt became clear and homogeneous and solidified on cooling.

The reaction involved proceeds according to the equation

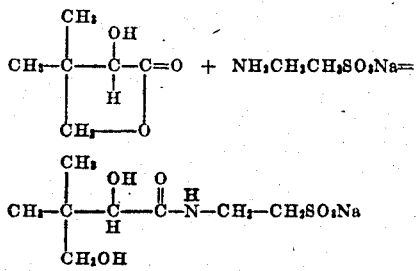

A higher fusion temperature may be employed to hasten the reaction and is necessary for best results when preparing the corresponding barium compound. The free sulfonic acid compound conveniently may be prepared by first preparing the barium salt and then removing the barium with sulfuric acid.

The product of the foregoing example was tested for growth inhibiting powers by use of *Lactobacillus arabinosus* in the medium described by Snell and Mitchell in "Proceedings of the National Academy of Science," vol. 27, page 1 (1941) to which was added 100γ each of uracil, adenine and guanine. The medium contained only 0.3γ of calcium pantothenate per 10 cc. Addition of 300γ of the above product or condensate completely inhibited growth. The growth inhibition produced by the addition of 10,000γ of the product to 10 cc. of the medium was, however, completely reversed by a simultaneous addition of 30γ of calcium pantothenate.

The product made according to the foregoing specific example contains about 80% of the condensation product as indicated by the extent of the reaction which was measured by determining the decrease in free amino nitrogen from the beginning to the end of the reaction. It has been found, however, that the products made by the condensation of different proportions of the lactone and the taurine salt, by carrying out the condensation at slightly different temperatures, by carrying out the condensation with longer and shorter periods of heating and by the substitution of taurine or the barium salt thereof for the sodium salt of taurine all exhibited the same growth inhibiting effect. On the other hand, neither taurine alone nor the lactone (α-hydroxy-β,β-dimethyl-γ-butyrolactone) alone in quantities equivalent to those of the condensation product used in the above described test produced any detectable growth inhibition. It follows, therefore, that it is the condensation product of the taurine and the lactone in the form of either the free acid or a salt thereof which exhibits the growth inhibiting effect antagonistic to the growth promoting effect of pantothenic acid. Various metal salts other than the sodium salt may be employed, such as the lithium, potassium, calcium, strontium and barium salts.

Example 2

To 7.8 grams of dl-α-hydroxy-β,β-dimethyl-γ-butyrolactone were added 11.2 grams of the dry powdered barium salt of taurine. The mixture was heated at 145–150° for 1 hour, then held at 135–140° for 2 hours. The viscous, yellowish mass set to a brittle solid. On testing with *Lactobacillus arabinosus* the product had the same growth-inhibiting properties possessed by the sodium salt. Quantitative comparison of the growth inhibiting properties of this melt with those of the sodium salt indicated an approximately quantitative yield in the reaction. A sample of the barium salt was purified for analysis by the following procedure.

4.0 grams of the powdered salt were dissolved in 100 cc. of methanol, in which the product is very soluble. After concentration to 40 cc., the solution was cooled and filtered. The barium salt was precipitated by addition of 5 volumes of acetone, filtered out, and reprecipitated twice in the same manner. The slightly yellow product was dissolved in water, heated briefly with decolorizing carbon, filtered, then evaporated to dryness in vacuo. The residue (2.1 gms.) was dried in vacuo at 100° over phosphorus pentoxide.

$(C_8H_{16}O_6NS)_2Ba$ --- Calculated __ N 4.34, Ba 21.27
Found _____ N 4.27, Ba 21.29

Example 3

The free acid is most conveniently prepared from the barium salt by double decomposition according to the equation:

$(C_8H_{16}O_6NS)_2Ba + H_2SO_4 \rightarrow BaSO_4 + 2C_8H_{17}O_6NS$

To 4 grams of barium salt prepared as described in Example 2 and dissolved in 30 cc. of water the theoretical amount (0.61 gm.) of $H_2SO_4$ was added. The solution was warmed briefly at 50°, and the insoluble barium sulfate filtered out. The solution when concentrated to dryness yielded a residue consisting of the free acid

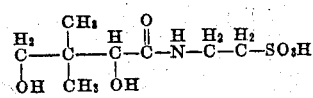

The product was tested for growth-inhibiting properties with *Lactobacillus arabinosus* as previously described, and showed full activity.

This application is a continuation-in-part of my application Serial No. 400,152, filed June 27, 1941.

I claim:

1. A process for the production of a compound having physiological activity which is antagonistic to the growth promoting properties of pantothenic acid which comprises heating an α-hydroxy-β,β-dimethyl-γ-butyrolactone with a taurine compound of the formula $NH_2CH_2CH_2SO_3X$ in which X stands for a member of the group consisting of hydrogen and the alkali and alkaline earth metals.

2. A process as defined in claim 1 in which X stands for hydrogen.

3. A process as defined in claim 1 in which X stands for an alkali metal.

4. A process as defined in claim 1 in which X stands for an alkaline earth metal.

5. A process as defined in claim 1 in which X stands for sodium.

6. A process as defined in claim 1 in which X stands for barium.

7. A compound of the formula

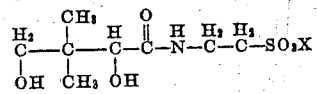

in which X stands for a member of the group consisting of hydrogen and the alkali and alkaline earth metals.

8. A compound as defined in claim 7 in which X stands for hydrogen.

9. A compounds as defined in claim 7 in which X stands for an alkali metal.

10. A compound as defined in claim 7 in which X stands for an alkaline earth metal.

11. A compound as defined in claim 7 in which X stands for sodium.

12. A compound as defined in claim 7 in which X stands for barium.

13. Process which comprises fusing a mixture of approximately 5 parts by weight of levo-α-hydroxy-β,β-dimethyl-γ-butyrolactone and approximately 5.7 parts by weight of the sodium salt of taurine.

ESMOND E. SNELL.